United States Patent Office 3,448,153
Patented June 3, 1969

3,448,153
**METHOD FOR THE PREPARATION OF
2-AMINO-1-ALKANOLS**
Stanley B. Cavitt and George P. Speranza, Austin, Tex.,
assignors to Jefferson Chemical Company, Inc., Houston, Tex., a corporation of Delaware
No Drawing. Filed May 31, 1966, Ser. No. 553,726
Int. Cl. C07c *91/02, 95/02, 97/02*
U.S. Cl. 260—584                    4 Claims

ABSTRACT OF THE DISCLOSURE

The reductive amination of 2-keto-1-alkanols produces 2-amino-1-alkanols. The products prepared in accordance with the invention are emulsifying agents that find application in the preparation of floor polishes, shoe polishes, automobile cleansers-polishes, emulsion paste waxes, and substituted piperazines by means of a cyclic reductive amination reaction. Further, alkylene oxides may be reacted with the amino-alkanols to yield nitrogen-containing polyether polyols useful in the preparation of polyurethanes.

---

This invention is concerned with the preparation of 2-amino-1-alkanols. More particularly, this invention is concerned with the preparation of 2-amino-1-alkanols by the reductive amination of 2-keto-1-alkanols.

It is well known that 1-amino-2-alkanols may be obtained by the reaction of alkylene oxides with ammonia and primary and secondary amines. However, this reaction is quite specific and always leads to the product having the amino group attached to the number one carbon atom and the hydroxyl group attached to the number two carbon atom. These compounds are the well known isoalkanolamines. Heretofore there has been no convenient method for the preparation of the 2-amino-1-alkanols, which are structural isomers of the isoalkanolamines. We have now discovered that the 2-amino-1-alkanols can be obtained in good yield by the reductive amination of 2-keto-1-alkanols over specific hydrogenation catalysts.

The products prepared in accordance with our invention, and particularly 2-amino-1-propanol, are emulsifying agents that find application in the preparation of floor polishes, shoe polishes, automobile cleaners-polishes and emulsion paste waxes. Further, these compounds may be employed in the preparation of substituted piperazines by means of a cyclic reductive amination reaction. Still further, alkylene oxides, and particularly propylene oxide, may be reacted with the aminoalkanols to yield nitrogen containing polyether polyols useful in the preparation of polyurethanes.

It has previously been reported by Berlin and Sycheva, J. Gen. Chem. (USSR) 20, 577 (1950); C.A. 44, 7765f, that the reductive amination of acetol over platinum black failed to yield the desired 2-amino-1-propanol. They were able to obtain a 20% yield of the product when acetol was treated with aqueous ammonium hydroxide in the presence of Raney nickel and hydrogen.

We have found that when a promoted nickel or cobalt catalyst is employed in the reaction much higher yields can be obtained and amines may be used in place of ammonia to give N-substituted aminoalkanols. The reaction is conducted in the presence of hydrogen at a temperature within the range of from about 50° to 200° C. and preferably within a range of from about 75° to 150° C. using a molecular ratio of ammonia or amine to 2-keto-1-alkanol of from about 10:1 to 1:10. The pressure at which the reaction is run is not particularly critical. Convenient pressures are 500–5000 p.s.i.g.

In accordance with our process a 2-keto-1-alkanol having the formula

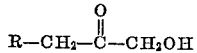

is reacted in the presence of hydrogen and the hydrogenation catalyst with a compound having the formula

to yield a 2-amino-1-alkanol having the formula

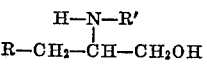

wherein R and R' are selected from the group consisting of hydrogen and aliphatic and aromatic hydrocarbon radicals containing from 1 to about 20 carbon atoms. Thus, suitable amino compounds for use in our process include ammonia, methylamine, ethylamine, cyclohexylamine, isopropylamine, dodecylamine, octadecylamine, aniline, benzylamine, p-nonylaniline, 2-phenylethylamine and 2-phenylpropylamine. Suitable 2-keto-1-alkanols include those in which R is hydrogen, methyl, ethyl, octadecyl, cyclohexyl, phenyl, benzyl and nonylphenyl. The preferred starting materials are ammonia and acetol.

Promoted catalysts are well known in the hydrogenation art. The particular catalysts for use in our process comprise a metal selected from the class consisting of nickel and cobalt promoted with one or more metals from Groups I-B and VI-B of the Periodic Table. Examples of acceptable promoting metals include copper, chromium, molybdenum, tungsten and mixtures thereof. Preferred promoters are mixtures of copper and chromium. A typical catalyst will comprise from about 60 to 85 mol percent nickel or cobalt and 40 to 15 mol percent promotors such as, for example, 14 to 37 mol percent copper and 1 to 5 mol percent chromium. The metals may be employed in the form of their oxides or in the form of the free metals. Chromium is preferably present as a nonreducible oxide.

Our process will be further illustrated by the following examples.

EXAMPLE I

To a 1,000 ml. stirred autoclave were charged a solution of 111 grams (1.5 mols) of acetol in 111 ml. of water and 50 grams of a nickel-copper-chromia catalyst. The reactor was flushed with hydrogen and charged with 102 grams (6.0 mols) of anhydrous ammonia. Hydrogen was added to a pressure of 500 p.s.i.g. and the reactor was then heated to approximately 150° C. for one hour. The reaction mixture was cooled, filtered to remove catalyst and subjected to aspirator vacuum for 30 to 45 minutes to remove the excess ammonia. More water and ammonia were removed from the product by distillation at atmospheric pressure and the product was then recovered by vacuum fractionation. There was obtained 58 grams of 2-amino-1-propanol having a boiling point of 77–80° C. at 15 mm. pressure and an index of refraction of 1.4482 An additional 23 grams of impure amine was obtained.

EXAMPLE II

To the 1,000 ml. stirred autoclave were added 50 grams of a nickel-copper-chromia catalyst and a solution of 222 grams (3.0 mols) of acetol in 100 ml. of methanol. The reactor was flushed with hydrogen and 240 grams (12.0 mols) of anhydrous ammonia was added. The reactor was then pressured to 500 pounds with hydrogen, heated to 100° C. and repressured to 3,000 p.s.i.g. with hydrogen as necessary. The reaction required approximately one hour for completion. After heating for an additional 30 minutes the reaction mixture was cooled, rinsed out with 50 ml. of methanol, filtered and stripped on a steam bath under aspirator vacuum. Distillation at 15 mm. gave 100 grams of 2-amino-1-propanol and 74 grams of residue.

EXAMPLE III

Example I was repeated except that 50 grams of a cobalt-copper-chromia catalyst was employed. The reaction stopped after approximately one-half hour. A yield of 34 grams of 2-amino-1-propanol was obtained.

EXAMPLE IV

To the 1,000 ml. stirred autoclave were added 50 grams of a nickel-copper-chromia catalyst and a solution consisting of 111 grams (1.5 mols) of acetol in 55 grams of ethanol, followed by the addition of 354 grams (6.0 mols) of isopropylamine, with stirring. The reactor was flushed with hydrogen, pressured to 1,000 p.s.i.g. with hydrogen and heated to 100° C. The reactor was repressured to 3,000 p.s.i.g. with hydrogen, as necessary. The reaction was allowed to proceed at approximately 100° C. for four hours. The product mixture was then rinsed from the reactor with 50 ml. of methanol, filtered, stripped to 50° C. on a steam bath under aspirator vacuum and distilled to give 112 grams of 2-(isopropylamino)-1-propanol having a boiling point of 65–66° C. at 15 mm. pressure.

EXAMPLE V

Example IV was repeated using 111 grams of water instead of the 55 grams of ethanol. A yield of 58 grams of 2-(isopropylamino)-1-propanol and 17 grams of an unidentified product having a boiling point of 75–77° C. at 15 mm. pressure was obtained. The unidentified product was believed to be 2,2′-isopropyliminobis(1-propanol) resulting from the further reaction of acetol with 2-(isopropylamino)-1-propanol.

Having thus described our invention we claim:

1. A method for the preparation of a 2-amino-1-alkanol having the formula

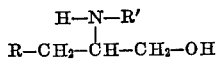

which comprises treating a 2-keto-1-alkanol having the formula

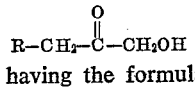

with a compound having the formula

in the presence of hydrogen and a hydrogenation catalyst comprising nickel or cobalt promoted with at least one metal from Groups I–B and VI–B at a temperature of from about 50–200° C., wherein R and R′ are alkyl, cyclohexyl, phenyl, phenyl-alkyl or alkyl-phenyl having up to 20 carbon atoms.

2. A method as in claim 1 wherein the catalyst is promoted with copper and chromium.

3. A method as in claim 2 wherein the temperature is 75–150° C.

4. A method as in claim 2 wherein both R and R′ are hydrogen.

References Cited

UNITED STATES PATENTS 1,966,478   7/1934   Baur.
1,989,325   1/1935   Lommel et al. ____ 260—585 X
2,618,658   11/1952  Caldwell _____ 260—584

CHARLES B. PARKER, *Primary Examiner.*

R. L. RAYMOND, *Assistant Examiner.*

U.S. Cl. X.R.

260—563, 570.6, 570.8, 570.9, 573, 585